US012722643B1

(12) United States Patent
Nguyen

(10) Patent No.: US 12,722,643 B1
(45) Date of Patent: Sep. 1, 2026

(54) DROWSY SENSOR FUSION

(71) Applicant: Lytx, Inc., San Diego, CA (US)

(72) Inventor: Vincent Nguyen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 176 days.

(21) Appl. No.: 18/073,302

(22) Filed: Dec. 1, 2022

(51) Int. Cl.
*B60W 40/08* (2012.01)
*B60W 50/14* (2020.01)
*G06V 20/56* (2022.01)
*G06V 20/59* (2022.01)
*G06V 40/18* (2022.01)

(52) U.S. Cl.
CPC ............ *B60W 40/08* (2013.01); *B60W 50/14* (2013.01); *G06V 20/588* (2022.01); *G06V 20/597* (2022.01); *G06V 40/18* (2022.01); *B60W 2050/143* (2013.01); *B60W 2050/146* (2013.01); *B60W 2540/229* (2020.02); *B60W 2756/10* (2020.02)

(58) Field of Classification Search
None
See application file for complete search history.

(56) References Cited

U.S. PATENT DOCUMENTS 9,290,174 B1 * 3/2016 Zagorski ............... B60W 30/18
10,486,591 B1 * 11/2019 Mezaael .................. B60Q 9/00
10,713,948 B1 * 7/2020 Kim ....................... G06V 40/20
11,663,508 B1 * 5/2023 Quach .................. G08G 1/0133 706/52
2008/0180257 A1 * 7/2008 Omi ....................... B60K 28/06 340/575
2012/0212353 A1 * 8/2012 Fung ...................... G08G 1/167 701/1
2013/0135092 A1 * 5/2013 Wu .......................... B60Q 9/00 340/439

(Continued)

FOREIGN PATENT DOCUMENTS

CN 103315754 A * 9/2013
CN 103370252 A * 10/2013 ............ B60K 28/06

(Continued)

OTHER PUBLICATIONS

S. Razzaq, M. N. Ahmad, M. M. Hamayun, A. ur Rahman and M. M. Fraz, "A hybrid approach for fatigue detection and quantification," 2017 International Multi-topic Conference (INMIC), Lahore, Pakistan, 2017, pp. 1-7, (Year: 2017).*

(Continued)

*Primary Examiner* — Mahmoud S Ismail
*Assistant Examiner* — Jacob Daniel Underbakke
(74) *Attorney, Agent, or Firm* — Van Pelt, Yi & James LLP

(57) ABSTRACT

A system for indicating a drowsy driver state comprises one or more interfaces and a processor. The one or more interfaces is configured to receive a set of driver images and a group of lane images over a time period and one or more lane departure indications. The processor is configured to: 1) determine a closed eyes statistic using a classifier based at least in part on the set of driver images; 2) determine a lane departure statistic using a classifier based at least in part on the group of lane images one or more lane departure indications; 3) determine a drowsy indication based at least in part on the closed eyes statistic and the lane departure statistic; and 4) provide the drowsy indication.

20 Claims, 7 Drawing Sheets

(56) References Cited

U.S. PATENT DOCUMENTS

| | | | | |
|---|---|---|---|---|
| 2013/0335213 | A1* | 12/2013 | Sherony | G08G 1/167<br>340/439 |
| 2014/0139655 | A1* | 5/2014 | Mimar | G08B 21/0476<br>340/575 |
| 2015/0070159 | A1* | 3/2015 | Okuda | B60W 40/08<br>340/439 |
| 2015/0351681 | A1* | 12/2015 | Lee | G08B 21/06<br>600/595 |
| 2016/0001781 | A1* | 1/2016 | Fung | G07C 9/37<br>701/36 |
| 2016/0052524 | A1* | 2/2016 | Kim | B60W 40/09<br>340/576 |
| 2016/0107653 | A1* | 4/2016 | Fung | B62D 6/001<br>701/41 |
| 2016/0217531 | A1* | 7/2016 | Ishikawa | G06Q 40/08 |
| 2017/0309092 | A1* | 10/2017 | Rosenbaum | G07C 5/0808 |
| 2017/0313190 | A1* | 11/2017 | Shimada | G16H 40/67 |
| 2018/0148066 | A1* | 5/2018 | Okamoto | G08G 1/0129 |
| 2018/0244288 | A1* | 8/2018 | Glaser | B60W 40/08 |
| 2018/0304806 | A1* | 10/2018 | Kim | A61B 5/1128 |
| 2018/0357894 | A1* | 12/2018 | Bjersing | B60K 28/06 |
| 2020/0164894 | A1* | 5/2020 | Yi | B60W 40/08 |
| 2020/0276978 | A1* | 9/2020 | Satou | G08G 1/16 |
| 2020/0286358 | A1* | 9/2020 | Doi | B60R 11/04 |
| 2021/0001875 | A1* | 1/2021 | Lim | G06V 20/588 |
| 2021/0245765 | A1* | 8/2021 | Golov | G07C 5/0858 |
| 2021/0312193 | A1* | 10/2021 | Alpert | H04N 7/183 |
| 2023/0065399 | A1* | 3/2023 | Ren | G16H 30/40 |

FOREIGN PATENT DOCUMENTS

| | | | | |
|---|---|---|---|---|
| KR | 20170040846 A | * 10/2015 | | |
| KR | 20200075556 A | * 12/2018 | | |
| KR | 20190083155 A | * 7/2019 | | B60W 40/08 |
| WO | WO-2007049499 A1 | * 5/2007 | | G01D 9/005 |

OTHER PUBLICATIONS

T. S. Manchanda, G. Singh and S. N. Singh, "Driver Drowsiness Detection using AI Techniques," 2021 9th International Conference on Reliability, Infocom Technologies and Optimization (Trends and Future Directions) (ICRITO), Noida, India, 2021, pp. 1-7, (Year: 2021).*

M. Hedi Baccour, F. Driewer, T. Schäck and E. Kasneci, "Camera-based Driver Drowsiness State Classification Using Logistic Regression Models," 2020 IEEE International Conference on Systems, Man, and Cybernetics (SMC), Toronto, ON, Canada, 2020, pp. 1-8, (Year: 2020).*

R. Oyini Mbouna, S. G. Kong and M.-G. Chun, "Visual Analysis of Eye State and Head Pose for Driver Alertness Monitoring," in IEEE Transactions on Intelligent Transportation Systems, vol. 14, No. 3, pp. 1462-1469, Sep. 2013, (Year: 2013).*

* cited by examiner

DROWSY SENSOR FUSION

BACKGROUND OF THE INVENTION

Driver fatigue and drowsiness are major risk factors in commercial transportation. While the causes for driver drowsiness are varied (e.g., insufficient sleep, driving at night, prolonged driving times, etc.), driver drowsiness contributes to the likelihood of vehicle accidents, severe injuries, and accidental death. Drivers are typically poor at gauging their state of drowsiness and this lack of awareness presents a safety problem as drivers are unaware that they are falling asleep.

BRIEF DESCRIPTION OF THE DRAWINGS

Various embodiments of the invention are disclosed in the following detailed description and the accompanying drawings.

DETAILED DESCRIPTION

Figure 1:
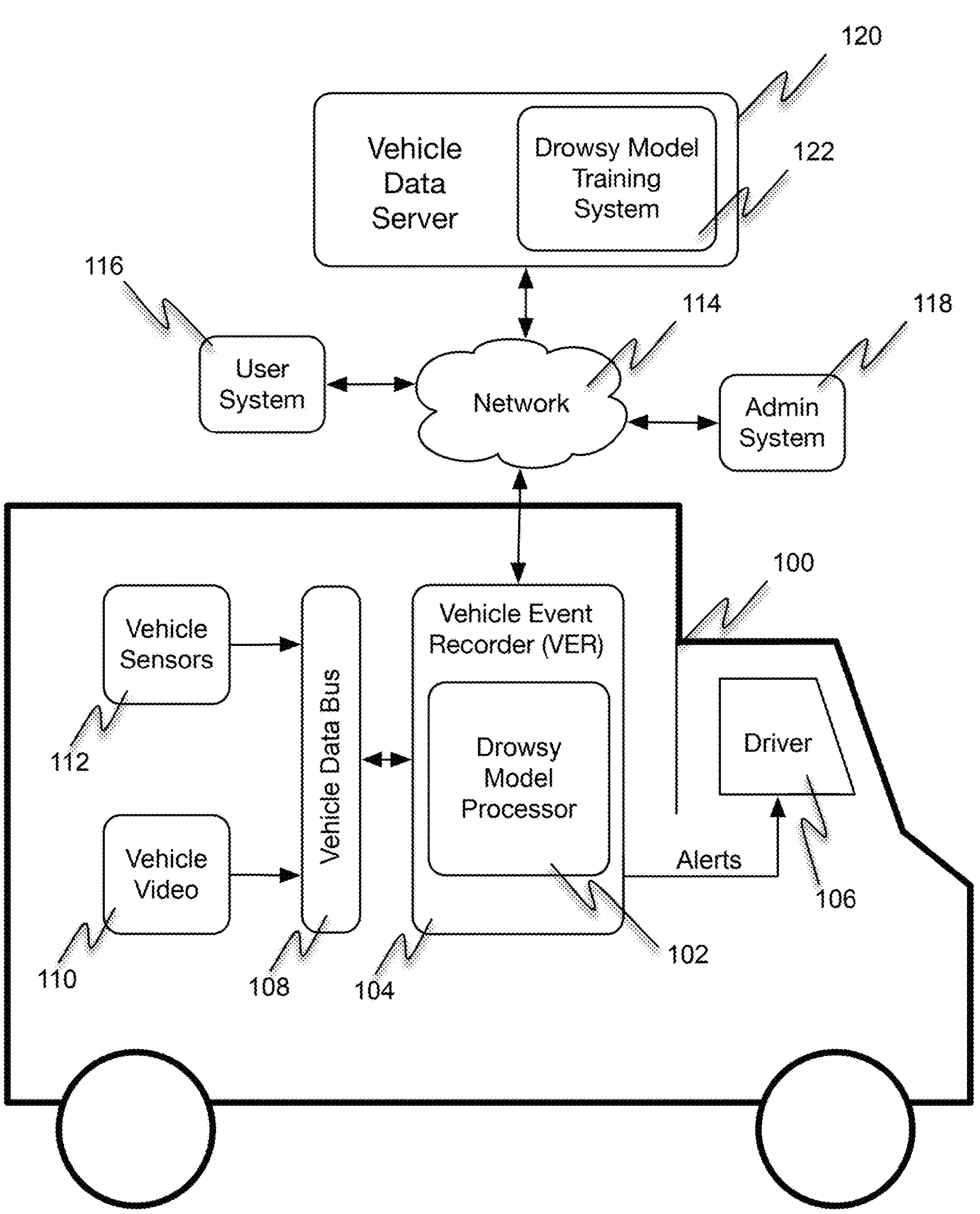
FIG. 1 is a block diagram illustrating an embodiment of a system for indicating a drowsy driver state.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for indicating a drowsy driver state is disclosed. The system comprises one or more interfaces and a processor. The one or more interfaces is configured to receive a set of driver images and a group of lane images over a time period and one or more lane departure indications. The processor is configured to: 1) determine a closed eyes statistic using a classifier based at least in part on the set of driver images; 2) determine a lane departure statistic using a classifier based at least in part on the group of lane images one or more lane departure indications; 3) determine a drowsy indication based at least in part on the closed eyes statistic and the lane departure statistic; and 4) provide the drowsy indication.

In various embodiments, the set of driver images and/or the group of lane images is/are collected over the time period or over a time interval different from the time period. In various embodiments, the time period and the time interval are one or more of the following: overlapping, concurrent, have a same duration, have a different duration, or occur within a time window. In various embodiments, the set of driver images over the time period comprises driver images over 30 seconds and/or images at 1 frame per second. In various embodiments, the drowsy indication is based at least in part on a trip duration, a time of day, sensor signatures associated with stopping events (e.g., accelerator sensor signatures and gyroscope sensor signatures), on a yawning indication, a curved road lane keeping indication, a lane change profile (e.g., a lane change duration, a lane change jerkiness, a lane change signal behavior, etc.), a monotonous driving indication, a reaction time (e.g., a reaction time to breaking after a car in front breaks), a driver behavior (e.g., a moving behavior, a radio behavior, a window opening behavior, etc.), a driver route familiarity indication, or any other appropriate factor. In some embodiments, the lane departure statistic comprises percentage time in a lane over another period of time (e.g., different from the time period and/or the time interval). In some embodiments, the processor is further configured to cause warning the driver (e.g., using an audio alert, using a visual alert, etc.).

In some embodiments, images of the driver are received from a camera—for example, a vehicle event recorder camera and/or a vehicle camera. A vehicle event recorder (VER) typically includes a set of sensors (e.g., cameras, video recorders, audio recorders, accelerometers, gyroscopes, vehicle state sensors, global positioning system sensors, etc.) that report data that can be analyzed to determine the occurrence of incidents such as high-risk events, process inefficiencies, driver compliance, or anomalous events. For example, video data is essential for identifying and documenting a wide range of distracted driving behaviors both inside and outside a vehicle, including cell phone use, eating or drinking, smoking, inattentive driving, lack of seat belt use, failure to stop at intersections, weaving within or departing from lanes, or following another vehicle too closely. While some distracted driving behaviors are conscious choices by the driver (e.g., not using a seat belt, cell phone use, eating etc.), driver physiology can also contribute to risky driving behavior. In particular, drivers are typically poor at gauging their state of drowsiness. This presents a safety problem for commercial transportation because a driver's lack of awareness of their state of drowsiness may result in the driver subsequently falling asleep and increasing the likelihood of vehicle accidents, severe injuries, and accidental death. In some embodiments, the processor is further configured to store the drowsy indication and/or statistics for the drowsy indication (e.g., storing number of indication, times of indications, etc.). In some embodiments, the processor is further configured to lower thresholds for storing events in response to a drowsy indication (e.g., a single indication, a threshold number of indications, a threshold number of indications per time, etc.). In some embodiments, the processor is further configured to lower thresholds for warning a driver about other events (e.g., a speed slow down event, a jerking steering event, a long blinker event, a jerky head motion event, a lane drift event, etc.).

In some embodiments, the system improves the computer by efficiently determining a drowsy indication through analyzing images from a video stream. The efficient determination enables alerting a driver and/or an administrator of drowsiness on a hardware processor that is available in a vehicle event recorder.

FIG. 1 is a block diagram illustrating an embodiment of a system for indicating a drowsy driver state. In the example shown, vehicle 100 comprises vehicle event recorder 104, drowsy model processor 102, vehicle data bus 108, vehicle video 110, vehicle sensors 112, and driver 106. Vehicle event recorder 104 communicates to user system 116, vehicle data server 120, and admin system 118 via network 114. Vehicle data server 120 comprises drowsy model training system 122.

Vehicle event recorder 104 receives real-time data from sensors on vehicle event recorder 104 and from vehicle video 110 and vehicle sensors 112 via vehicle data bus 108. In various embodiments, drowsy model processor 102 predicts the degree to which a driver may be in a drowsy state using statistical information about driver eye-closure, vehicle lane position, vehicle sensors, and/or driver ancillary data. In some embodiments, vehicle event recorder 104 processes the real-time data with drowsy model processor 102 to generate automated driver assistance alerts for driver 106 and driver drowsy state video annotations that are transmitted via network 114 to vehicle data server 120.

In some embodiments, admin system 118 administers instructions to drowsy training system 122 via network 114 in order to generate a drowsy model for use in drowsy model processor 102. Drowsy training system 122 receives training images and labels from vehicle data server 122 and outputs a drowsy model update to drowsy model processor 102 via network 114. User system 116 queries vehicle data server 122 to view vehicle video annotated by drowsy model processor 102 via network 114.

In some embodiments, the system for drowsy models (e.g., model training and model processor) makes a computer better by enabling an eye-closure indication task to be performed efficiently using limited processing resources. For example, by using a machine learning model that processes an entire image at once in order to determine an eye-closed indication. As another example, the system uses both eye statistics derived from processing an entire image (e.g., without segmenting image preprocessing steps) as well as lane position statistics to determine a drowsy state. In addition, the drowsy sensor fusion system conserves memory and processor resources. In some embodiments, the system described herein determines whether the eyes are open or closed (e.g., a binary state determination, no determination of level of eye closure). In some embodiments, the system described herein determines whether the eyes in an image are open or closed and a confidence level. In some embodiments, the system determines an eye-open or an eye-closed state using a frame rate of 1 frame per second, which is much lower than typical drowsy determination systems that use a higher frame rate to monitor blinks which typically last for 150-300 ms). In some embodiments, a drowsy determination is made using binary eye closure determinations (e.g., at 1 frame per second) and time periods for the binary eye closure determinations are long time periods (e.g., 30 seconds or longer—for example, 1 minute, 2 minute, 5 minutes, 10 minutes, etc.).

Figure 2:
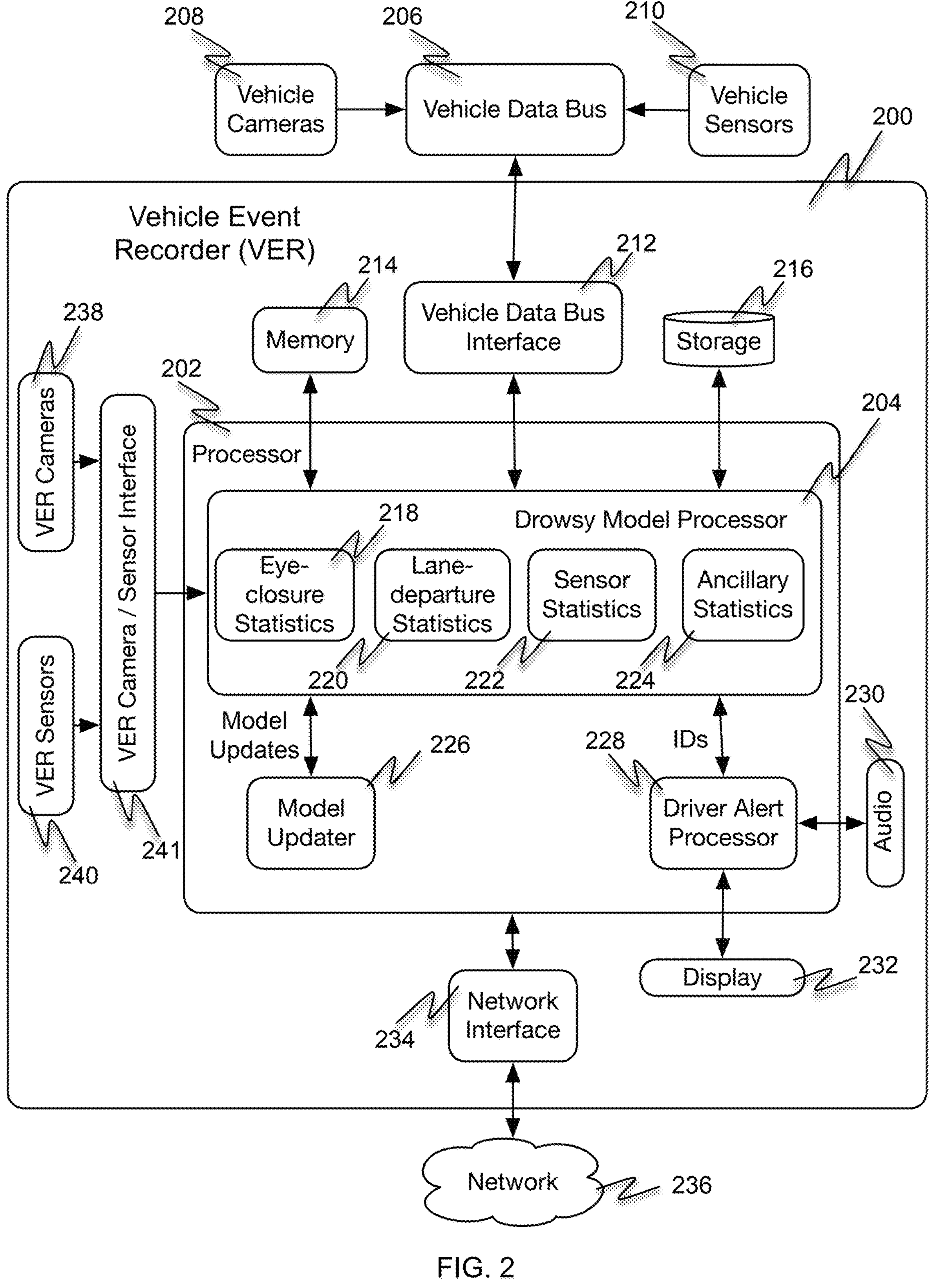
FIG. 2 is a block diagram illustrating an embodiment of a vehicle event recorder (VER).

FIG. 2 is a block diagram illustrating an embodiment of a vehicle event recorder (VER). In some embodiments, vehicle event recorder 200 of FIG. 2 is used to implement vehicle event recorder 104 of FIG. 1. In the example shown, vehicle event recorder 200 comprises processor 202, vehicle data bus interface 212, memory 214, storage 216, VER cameras 238, VER sensors 240, VER camera/sensor interface 241, audio 230, display 232, and network interface 234. Processor 202 further comprises drowsy model processor 204, model updater 226, and driver alert processor 228. Drowsy model processor 204 further comprises eye-closure statistics module 218, lane-departure statistics module 220, sensor statistics module 222, and ancillary statistics module 224.

In the example shown, drowsy model processor 204 receives images and sensor data using VER camera/sensor interface 241 from VER cameras 238 and VER sensors 240 and other vehicle camera(s) and/or sensor(s) via vehicle data bus interface 212. Eye-closure statistics module 218 processes received image frames from VER cameras 238 (e.g., an inward facing camera capturing images of the vehicle interior) and generates one or more statistical metrics of driver eye closure for a period of time. In some embodiments, the statistical metrics of driver eye closure for a period of time are generated periodically at a metrics-update rate. In some embodiments, the metrics-update rate is equal to the frame rate of driver images. In some embodiments, the set of driver images over the period of time comprises driver images taken periodically over 30 seconds. In some embodiments, the set of driver images comprises driver images at 1 frame per second. For example, eye-closure statistics module 218 uses a deep learning model that classifies a single image frame of a driver as either having eyes-closed or eyes-open. The set of eye-closure classifications over a period of time are used to compute at a metrics-update rate, the fraction of time over a time period that the driver's eyes were closed. A higher fraction of time the driver is in the eye-closed state is an indication of drowsiness. In some embodiments, greater than 20% of time in eye-closed state indicates drowsiness or any other appropriate threshold. In some embodiments, a deep learning model classifies a single image frame of a driver as having eyes-closed, partially-closed, or eyes-open. In some embodiments, the set of eye-closure classifications over a period of time are used to compute at a metrics update rate, the fraction of time over a time period that the driver's eyes were closed, partially closed, or open.

Lane-departure statistics module 220 processes received image frames from vehicle cameras 208 and generates statistical metrics of vehicle lane-departure for a time interval. For example, lane-departure statistics module 220 generates statistical metrics of vehicle lane-departure for the previous 5 seconds, 60 seconds, or any appropriate time interval. In some embodiments, the lane departure statistic comprises a percentage time the vehicle is centered in a lane over a second period of time. For example, the lane departure statistic comprises a percentage time the vehicle is centered in a lane over the previous 10 seconds, 90 seconds, or any appropriate period of time. In some embodiments, the second time interval for determining lane departure statistics and the first period of for determining eye-closure statistics are: overlapping, concurrent, have a same duration, have a different duration, or occur within a time window. For example, lane-departure statistics module 220 uses a deep learning model to calculate lane heatmaps that indicate where the lanes are likely to exist in the image and to cluster the lane pixels to distinct lanes. In some embodiments, the likely lane locations are used to identify pixel regions where lanes exist and to calculate statistical measures of how centered the vehicle is in the lane, how well the vehicle is tracking the lane, and if the vehicle departs the lane. A higher fraction of time the vehicle is not centered in the lane, poorly tracking the lane, or departs the lane is an indication of drowsiness. In some embodiments, the drowsy indication is further based at least in part on a lane change profile statistic. For example, the duration of the vehicle traveling near a lane boundary, jerkiness of the vehicle near a lane boundary, or lane departure of the vehicle without signaling may be an indication of drowsiness.

Sensor statistics module 222 processes data received from vehicle sensors 210 and VER sensors 240 and generates sensor statistics for processing by drowsy model processor 204. In some embodiments, sensor data may include data from audio recorders, accelerometers, gyroscopes, vehicle state sensors (e.g., turn signal use, steering position, window position, radio use, etc.) global positioning system sensors, etc. For example, data from sensor statistics module 222 indicates anomalous abrupt steering corrections for a period of time. When correlated with data from lane-departure statistics module 220 that indicates anomalous lane boundary crossings, a larger than average time the eyes are closed, and no use of turn signals, drowsy model processor 204 indicates that the driver maybe drowsy. In some embodiments, the drowsy indication is further based at least in part on sensor signatures associated with stopping events (e.g., velocity and stability changes). In some embodiments, the drowsy indication is further based at least in part on a driver reaction time to a car in front of the vehicle breaking. In some embodiments, the drowsy indication is further based at least in part on a driver behavior (e.g., fidgeting, radio manipulation, rolling windows up/down, etc.). The drowsy processor combines signals (e.g., sensor signals and sensor statistics) and makes a determination of drowsiness state. Each signal passed in should be pre-processed in a way that extracts meaningful features for determining drowsy/non drowsy (e.g., mean deviation from center of the lane derived from raw lane detection data). In the machine learning (ML) vernacular, features have been appropriately extracted from these signals. All the features are then fed to the drowsy processor. In some embodiments, the processor is a ML model (e.g., a model separate from computer vision models for eye closure or lane detection) that was trained in a supervised fashion (e.g., with a set of examples of features/labels, the labels being drowsy or not drowsy, etc.). This ML model decides the best way to 'bundle' the features and decide on drowsiness state (e.g., drowsy or not drowsy). In some embodiments, a training data set is collected using heuristic rules (e.g., thresholds on features).

Ancillary statistics module 224 processes data received from network interface 234 and generates ancillary driver statistics for processing by drowsy model processor 204. In some embodiments, ancillary data may include data about current road conditions and road type, weather, duration of trip, time of day, time since last break, degree of monotonous driving, driver route familiarity and/or any other appropriate information. In some embodiments, drowsy model processor 204 indicates potential driver drowsiness based on data from ancillary statistics module 224. In some embodiments, drowsy model processor 204 indicates potential driver drowsiness based on data from ancillary statistics module 224 and data from one or more statistics modules (e.g., sensor statistics module 222, lane-departure statistics module 220, and/or eye-closure statistics module 218). In some embodiments, the drowsy indication is further based at least in part on a trip duration, on a time of day, on a monotonous driving indication, on a driver route familiarity indication, and/or any other appropriate ancillary information. For example, data from ancillary statistics module 224 indicates the driver has been driving at night in light fog for 4 hours without a break. When correlated with data from eye-closure statistics module 218 that shows an increase in eye-closure duration, drowsy model processor 204 indicates that the driver maybe drowsy.

Drowsy model processor 204 updates its data models via model updater 226. For example, drowsy model training system 122 of FIG. 1 trains a new model that improves the ability to detect driver eye closures from a single image frame and admin system 118 of FIG. 1 instructs vehicle data server 120 of FIG. 1 to deploy the new model to the vehicle. Vehicle data server 120 sends the new model to the vehicle's model updater 226 via network 236 and model updater 226 updates the eye-closure statistics model 218 in drowsy model processor 204. In various embodiments, model updater 226 updates lane-departure statistics module 220, sensor statistics module 222, and ancillary statistics module 224. To train a drowsy model, data is collected with examples of drowsiness. The initial model (e.g., based on simple heuristic rules) flags video clips of interest to be reviewed by a human. The reviewer indicates if drowsiness occurs in the video clip. Once a dataset is collected, standard supervised learning techniques are applied. In some embodiments, supervised learning of the model is performed in addition to updating the computer-vision based eye closure model.

In some embodiments, drowsy model processor 204 sends and receives data from storage 216. For example, when network 236 is unavailable, drowsy model processor 204 stores the statistical time series data generated by eye-closure statistics module 218, lane-departure statistics module 220, sensor statistics module 222, and ancillary statistics module 224 until network 236 is available. In some embodiments, drowsy model processor 204 sends and receives data from memory 214 during processing for temporary storage.

Driver alert processor 228 communicates with the driver via audio 230 and display 232. For example, drowsy model processor 204 identifies that the vehicle is not centered in a determined lane and that in the past 30 seconds, the percentage of time the driver's eyes have been closed is above a threshold. In some embodiments, driver alert processor 228 receives the drowsy indication from drowsy model processor 204. In some embodiments, driver alert processor 228 sends the driver a warning message via audio 230 and/or display 232. For example, the warning message may indicate that the vehicle is drifting from the current lane, the vehicle speed is higher than a threshold for current road conditions, there is a pedestrian ahead, and/or any other appropriate warning message. In various embodiments, the driver is alerted with a collision warning (e.g., closing in on an object too quickly where hard braking may be required), a headway warning (e.g., tailgating, not leaving more that 2 seconds of reaction time in front of the vehicle for current driving conditions), lane departure warning (e.g., crossing a lane without indicating with turn signal), fitness to lane warning (e.g., how well vehicle keeps within the lane), a rolling stop warning (e.g., vehicle did not come to a complete stop when stop sign applicable to vehicle is present), and/or any other appropriate warning.

In various embodiments, the drowsy model processor 204 is further configured to lower thresholds for storing events when drowsy. In some embodiments, the processor is further configured to lower thresholds for warning driver about other items. In some embodiments, the processor is further configured to store the drowsy indication and statistics for indication of drowsiness.

Figure 3:
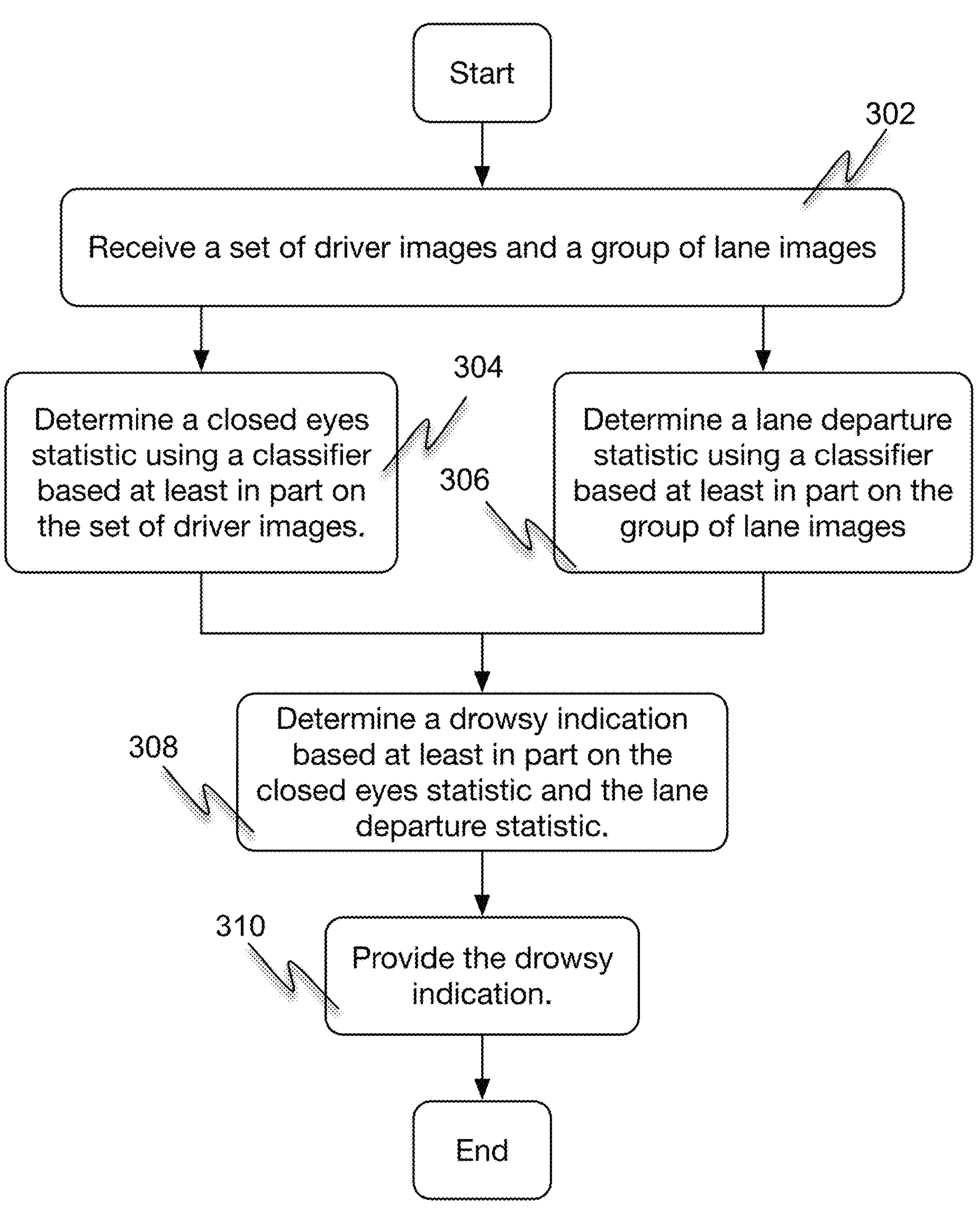
FIG. 3 is a flow diagram illustrating an embodiment of a system for indicating a drowsy driver state.

FIG. 3 is a flow diagram illustrating an embodiment of a system for indicating a drowsy driver state. In some embodiments, the process of FIG. 3 is executed by the system for indicating a drowsy driver state of FIG. 1. In the example shown in 302, a set of driver images and a group of lane images is received and control is passed to 304 and 306. In some embodiments, control is passed to 304 and then serially to 306. In some embodiments, control is passed to 306 and then serially to 304. In various embodiments, a set of driver images is received from VER camera(s) and a group of lane images is received from vehicle camera(s) or images are received from any other appropriate source(s). In some embodiments, VER cameras are implemented by VER cameras 238 of FIG. 2. In some embodiments, vehicle cameras are implemented by vehicle cameras 208 of FIG. 2.

In 304, a closed eyes statistic using a classifier based at least in part on the set of driver images is determined and control is passed to 308. In some embodiments, a closed eyes statistic is computed by eye-closure statistics module 218 of FIG. 2. For example, a set of driver images comprising driver images at 1 frame per second over a period of 30 seconds is collected and processed by a deep learning model that classifies each image frame of a driver as having eyes-closed, partially-closed, or eyes-open. The percent of time the driver's eyes are closed or partially closed in the last 30 second is computed from the set of classified driver images. In some embodiments, whole images are processed without segmentation of an image and/or identification of faces, eyes, etc. In some embodiments, eye state statistic is calculated as the fraction of frames that are determined to be not eyes open (e.g., fully open, open state (binary determination), partially closed, etc.) in the last 30 seconds. The eye state statistc is one of the many features that will be passed to the drowsy model.

In 306, a lane departure statistic using a classifier based at least in part on the group of lane images is determined and control is passed to 308. In some embodiments, a lane departure statistic is computed by lane departure statistic module 220 of FIG. 2. For example, a group of lane images is received from vehicle cameras 208 of FIG. 2 and statistical metrics of vehicle lane-departure for a time interval (e.g., 30 seconds) are generated. In some embodiments, a deep learning model is used to calculate lane heatmaps that indicate where the lanes are likely to exist in the image and to cluster the lane pixels to distinct lanes. In some embodiments, the likely lane locations are used to identify pixel regions where lanes exist and to calculate statistical measures of how centered the vehicle is in the lane, how well the vehicle is tracking the lane, and if the vehicle departs the lane. In some embodiments, the system includes advanced driver assistance systems (ADAS) algorithms to detect lane markers and to estimate lanes and the relative vehicle position within the lane over time. In some embodiments, lane statistics are determined—for example, mean deviation from the center of the lane, number of lane departure warnings (e.g., vehicle wheel crossing of a lane marker without lane change), estimation of lane change dynamics (e.g., including coupling with accelerometer measurements to measure lateral acceleration, smoothness, etc.), etc.

In 308, a drowsy indication based at least in part on the closed eyes statistic and the lane departure statistic is determined and control is passed to 310. In some embodiments, greater than 20% of time in eye-closed state indicates drowsiness or any other appropriate threshold. In some embodiments, a higher fraction of time the vehicle is not centered in the lane, poorly tracking the lane, or departs the lane is an indication of drowsiness. In some embodiments, the drowsy indication is further based at least in part on a lane change profile statistic. For example, the duration of the vehicle traveling near a lane boundary, jerkiness of the vehicle near a lane boundary, or lane departure of the vehicle without signaling may be an indication of drowsiness. In 310, the drowsy indication is provided, and the process ends.

Figure 4:
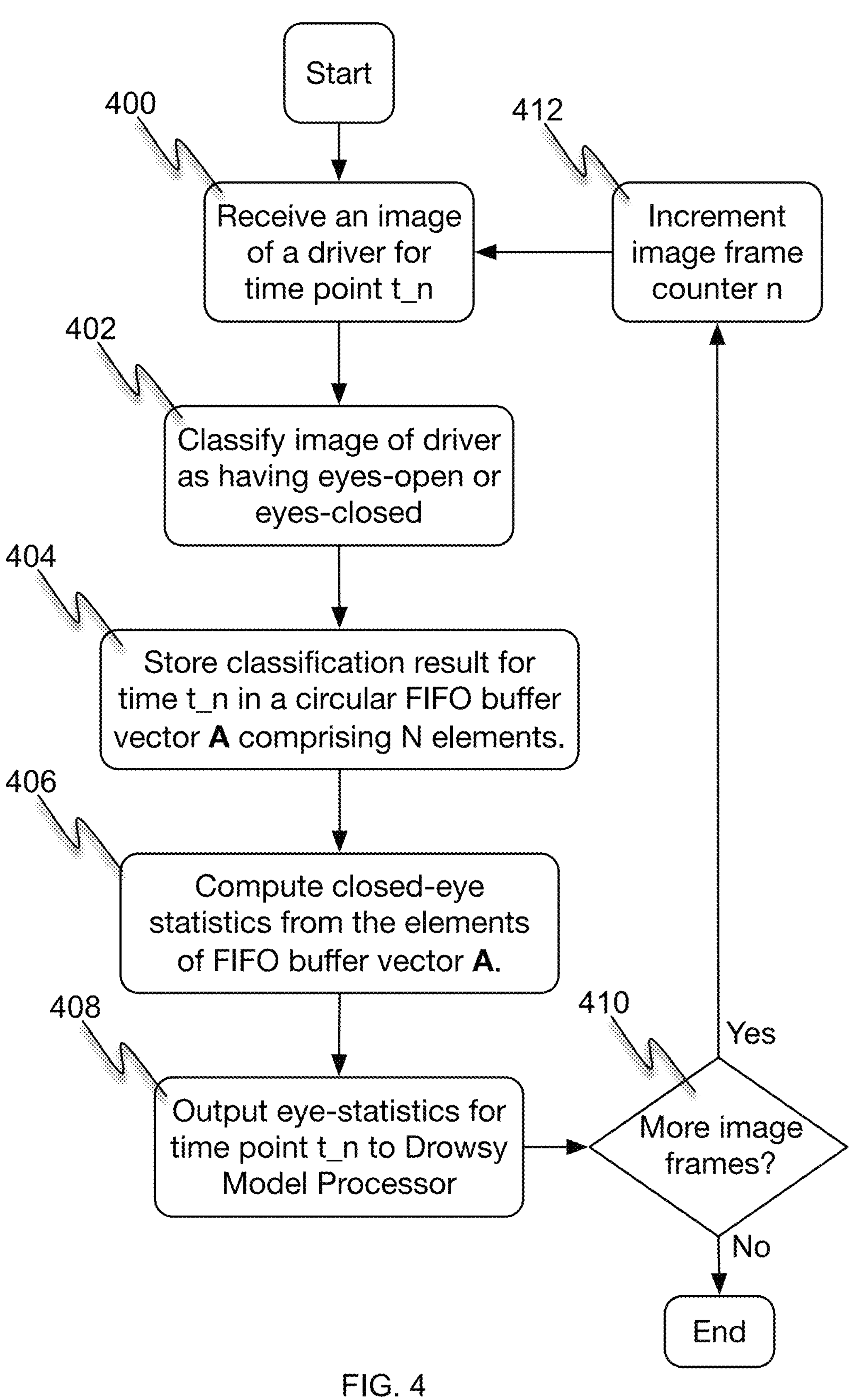
FIG. 4 is a flow diagram illustrating an embodiment of a system for determining a closed eyes statistic using a classifier.

FIG. 4 is a flow diagram illustrating an embodiment of a system for determining a closed eyes statistic using a classifier. In some embodiments, the process of FIG. 4 is implemented using 218 of FIG. 2. In some embodiments, the classifier determines the closed eyes statistic based at least in part on the set of driver images. In the example shown, in 400, an image of a driver for time point t_n is received, and control is passed to 402. In 402, an image of driver is classified as having eyes-open or eyes-closed and control is passed to 404. For example, a deep learning model classifies a single image frame at time t_n of a driver as either having eyes-closed or eyes-open. In 404, the classification result for time t_n is stored in a circular FIFO buffer vector A comprising N elements and control is passed to 406. In 406, closed-eye statistics are computed from the elements of FIFO buffer vector A and control is passed to 408. For example, the number of elements of vector A that are classified as eye-closed divided by the total number of elements N comprising vector A is used to determine the percent time the driver's eyes are closed. In 408, eye-statistics for time point t_n is output to Drowsy Model Processor and control is passed to 410. In 410, it is determined if there are more image frames to be processed. If there are no more image frames, the process ends. If there are more image frames, control is passed to 412. In 412, the image frame counter n is incremented and control is passed to 400.

Figure 5:
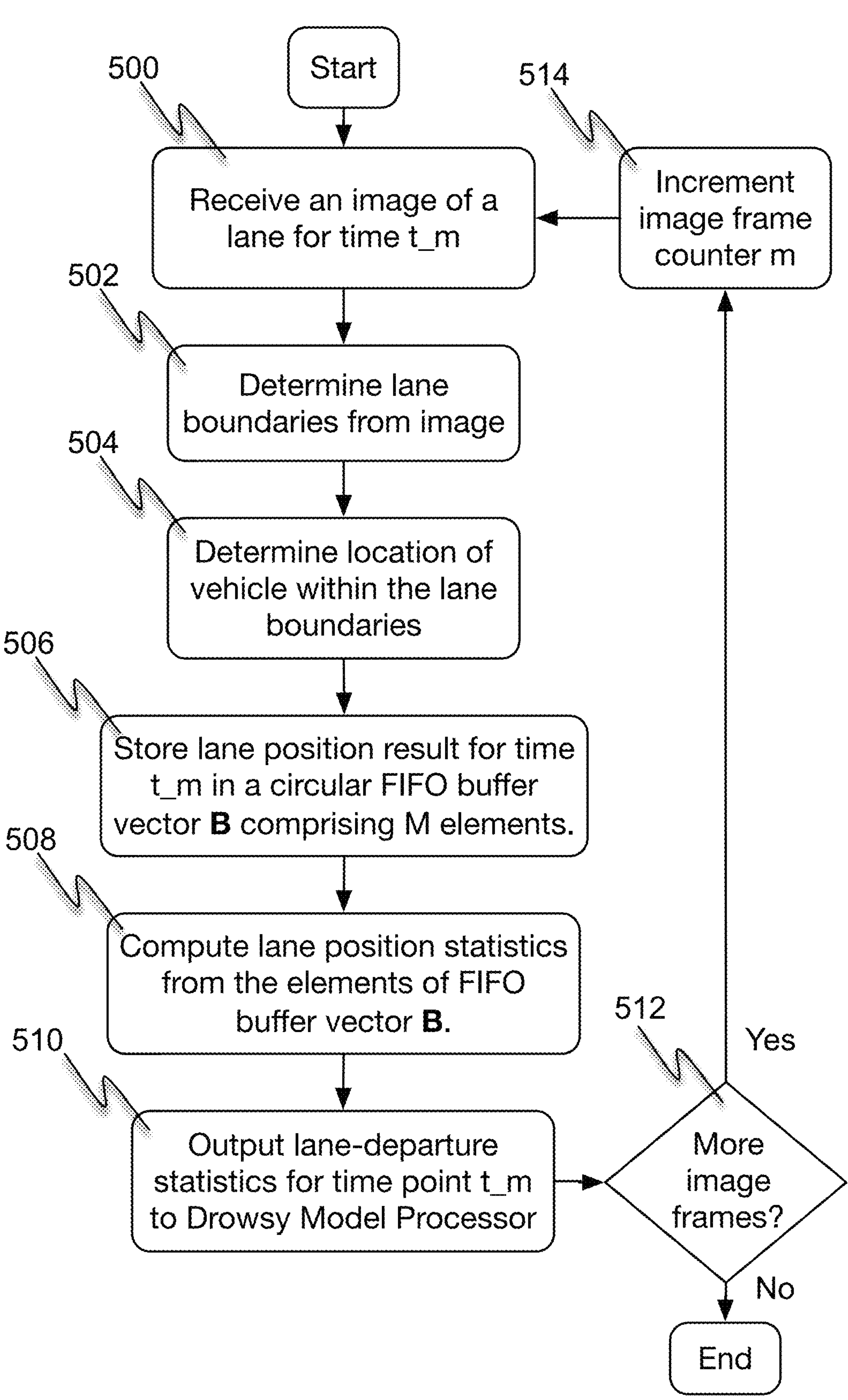
FIG. 5 is a flow diagram illustrating an embodiment of a system for determining a lane departure statistic using a classifier.

FIG. 5 is a flow diagram illustrating an embodiment of a system for determining a lane departure statistic using a classifier. In some embodiments, the process of FIG. 5 is implemented using 220 of FIG. 2. In some embodiments, the classifier determines the lane departure statistic based at least in part on the group of lane images.

In the example shown, in 500, an image of a lane for time point t_m is received and control is passed to 502. In 502, lane boundaries of an image of a lane are determined and control is passed to 504. For example, a machine learning model determines a lane location heat map. In some embodiments, the lane heat map comprises one or more of: a lane location heat map, one or two vertical affinity fields for lanes, and/or a horizontal affinity field for lanes. In various embodiments, the lane heat map is post processed to determine lane areas. For example, a threshold is applied to the lane heatmap intensity to segment out regions of likely lane locations. The likely lane locations are used to identify pixel regions where lanes exist. Further, the horizontal and vertical affinity field values are used at those thresholded lane pixel locations to cluster lanes together into individual entities. In some embodiments, fitting a cubic spline to sets of lane edge points is utilized as a lane annotation.

In some embodiments, the system estimates 'birds-eye-view' positions of the vehicle and lanes. In some embodiments, lateral distances are calculated between our vehicles tires and the lane markings.

In 504, the location of the vehicle within the lane boundaries is determined and control is passed to 506. For example, the lane position is determined from a distance between the sides of the vehicle and the relevant lane edge. In 506, the lane position result for time t_m is stored in a circular first in first out (FIFO) buffer vector B comprising M elements, and control is passed to 508. In 508, lane position statistics are computed from the elements of FIFO buffer vector B, and control is passed to 510. For example, the number of elements of vector B that are classified as crossing or within a threshold of a lane boundary divided by the total number of elements M comprising vector B is used to determine the percent time the vehicle is near or crossing a lane boundary. In 510, lane-departure statistics for time point t_m is output to Drowsy Model Processor, and control is passed to 512. In 512, it is determined whether there are more image frames to be processed. In response to there being no more image frames, the process ends. In response to there being more image frames, control is passed to 514. In 514, the image frame counter m is incremented, and control is passed to 500.

Figure 6:
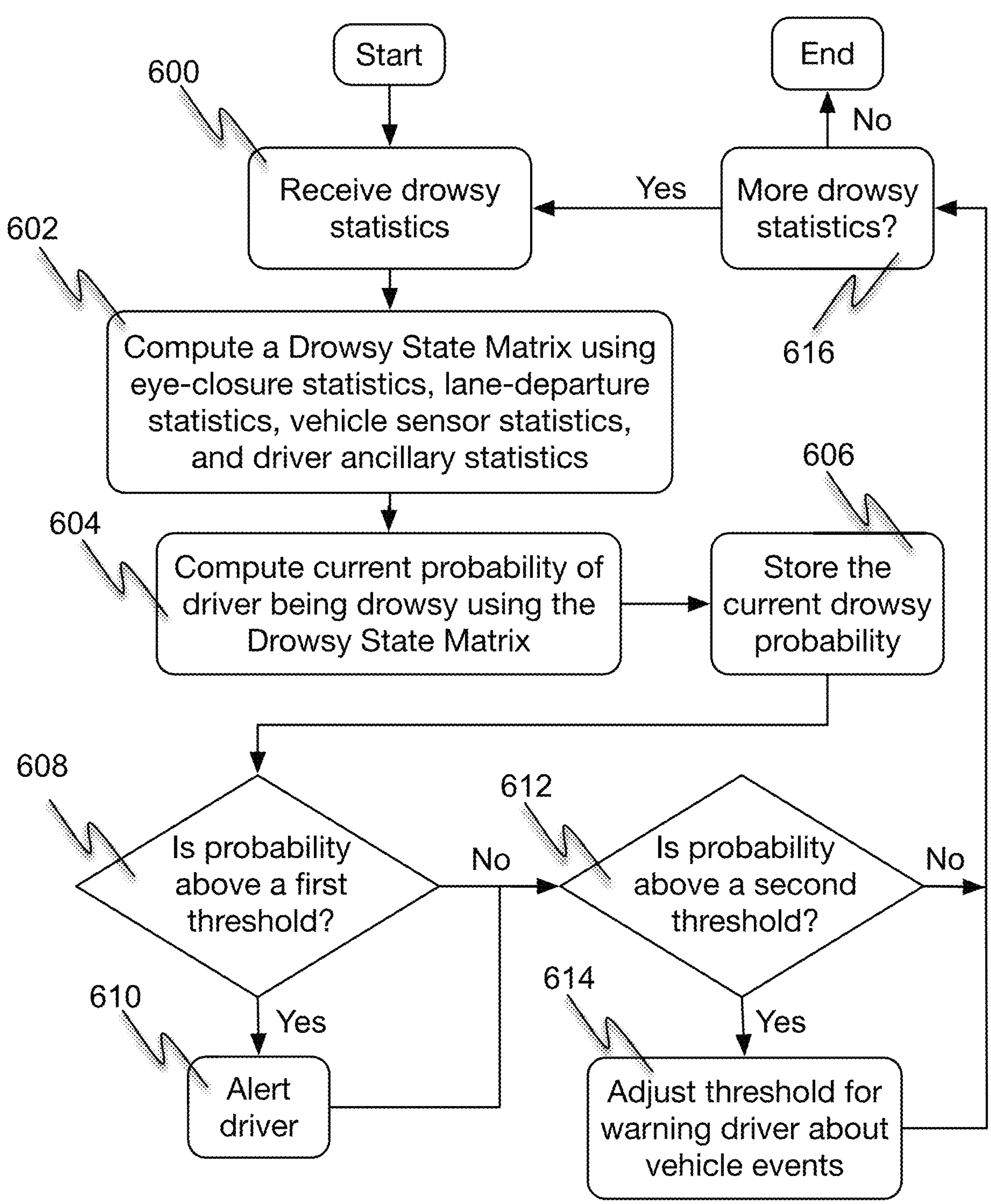
FIG. 6 is a flow diagram illustrating an embodiment of a system for computing the probability of a driver being drowsy.

FIG. 6 is a flow diagram illustrating an embodiment of a system for computing the probability of a driver being drowsy. In some embodiments, the process of FIG. 6 is implemented using drowsy model processor 204 of FIG. 2. In some embodiments, a drowsy indication is based at least in part on the closed eyes statistic and the lane departure statistic. In some embodiments, the drowsy indication is provided by drowsy model processor 204 of FIG. 2.

In the example shown, in 600, drowsy statistics are received, and control is passed to 602. For example, eye-closure statistics, lane departure statistics, vehicle sensor statistics, and drive ancillary statistics are received. In some embodiments, eye-closure statistics are generated by eye-closure statistic model 218 of FIG. 2, lane departure statistics are generated by lane departure statistic module 220 of FIG. 2, sensor statistics are generated by sensor statistic module 222 of FIG. 2, and ancillary statistics are generated by ancillary statistic module 224.

In 602, a drowsy state matrix using eye-closure statistics, lane-departure statistics, vehicle sensor statistics, and driver ancillary statistics is computed, and control is passed to 604. For example, drowsy state matrix comprises one or more columns for each of eye-closure statistics, lane-departure statistics, vehicle sensor statistics, and driver ancillary statistics where each row contains the elements for a particular time in the past. In some embodiments, the column of the drowsy state matrix comprising eye-closure statistics contains elements representing the percent time the driver's eyes are closed. In some embodiments, the column of the drowsy state matrix comprising lane-departure statistics contains elements representing the percent time the vehicle is near or crossing a lane boundary. In some embodiments, the column of the drowsy state matrix comprising vehicle sensor statistics contains elements representing whether a turning signal is activated. In some embodiments, the column of the drowsy state matrix comprising driver ancillary statistics contains elements representing the duration of the current trip.

In 604, the current probability of the driver being drowsy is computed using the drowsy state matrix, and control is passed to 606. For example, drowsy model processor 204 of FIG. 2 processes the drowsy state matrix using the drowsy model provided by model updater 226 of FIG. 2 to output an estimate of the probability that the driver is drowsy. In some embodiments, model updater 226 receives the current drowsy model from drowsy training system 122 of FIG. 1.

In 606, the current drowsy probability is stored, and control is passed to 608. For example, the probability that the driver is drowsy is stored in storage 216 of FIG. 2. In 608, whether the probability of the driver being drowsy is above a first threshold is determined. In response to being above a first threshold, control is passed to 610, otherwise control is passed to 612. In 610, the driver is alerted that they may be falling asleep, and control is passed to 612. In 612, it is determined whether the probability of the driver being drowsy is above a second threshold. In response to being above a second threshold, control is passed to 614, otherwise control is passed to 616.

In 614, the threshold for warning the driver about vehicle events is adjusted, and control is passed to 616. For example, the probability that the driver is drowsy is in an intermediate range and may indicate a potential for decreased alertness. In response, the threshold for warning the driver about other vehicle events (e.g., distance to vehicle ahead, speed changes, long blinkers, etc.) may be adjusted to be more sensitive (e.g., increasing a threshold for the distance to vehicle ahead, lowering a threshold for changes in speed, lowering a threshold for the time blinkers are kept on, etc.). In some embodiments, the drowsy processor is further configured to lower thresholds for storing events in response to a drowsy indication. For example, the probability that the driver is drowsy is in an intermediate range and may indicate a potential for decreased alertness. In response, the threshold for storing vehicle events (e.g., distance to vehicle ahead, speed changes, long blinkers, etc.) is lowered.

In 616, it is determined whether there are more drowsy statistics to process. In response to there being no more drowsy statistics, the process ends. In response to there being more drowsy statistics, control is passed to 600.

Figure 7:
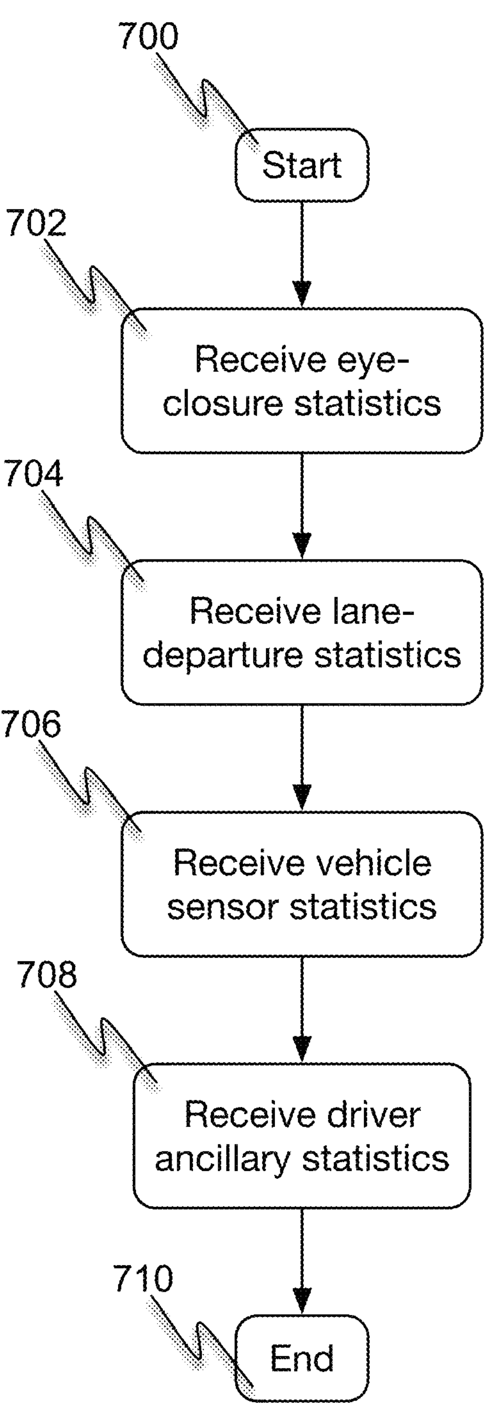
FIG. 7 is a flow diagram illustrating an embodiment of a process for receiving drowsy statistics.

FIG. 7 is a flow diagram illustrating an embodiment of a process for receiving drowsy statistics. In some embodiments, the process of FIG. 7 is executed by process for receiving drowsy statistics 600 of FIG. 6. In the example shown in 702, eye-closure statistics are received, and control is passed to 704. For example, statistics are received indicating the percentage of time that the eyes are detected as being closed from analyzing images of an interior camera of a vehicle. In some embodiments, the images are analyzed using a model that does not require preprocessing of the image to segment out a head area or an eye area. In some embodiments, the image is a portion of a video stream. In 704, lane departure statistics are received, and control is passed to 706. For example, statistics are received indicating a position within a lane are detected as being stable (e.g., within the center 30%, 50%, 70%, etc. of a lane over a period of time) from analyzing images of an exterior camera of a vehicle (e.g., a vehicle event recorder camera, a car mounted forward camera, a car mounted rear camera, etc.). In some embodiments, lane detection uses a model to detect lane boundary pixels. In some embodiments, a line is fit to lane boundary pixels to determine lanes. In various embodiments, one or more of: a distance to a center of a lane, a distance to a lane edge, a drift from a center of a lane, a drift from a lane edge, a frequency of a drift from a center of a lane, a frequency of a drift from a lane edge, or any other appropriate lane statistic is/are calculated. In 706, vehicle sensor statistics are received, and control is passed to 708. For example, vehicle sensor information is received for processing relevant statistics useful in determining drowsy behavior (e.g., braking information, speed information, ignition information, trip length information, blinker information, lane information, proximity sensor information, cabin temperature, steering wheel angle, cruise control state, wiper state, radio state, climate control state (e.g., heating settings, air conditioning settings, etc.). In 708, driver ancillary statistics are received, and control is passed to 710. For example, ancillary statistics are received related to a driver useful in determining drowsy behavior (e.g., time of day, shift times, start of trip time, end of trip time, hours driven by the driver in a prior week, hours driven by the driver today, weather conditions, prior vacation times/dates, history of distractions, length of tenure, age of driver, driver prescribed medication, etc.). In 710, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a vehicle event recorder mounted to a vehicle, wherein the vehicle event recorder comprises:

one or more interfaces configured to:

receive over a time period a set of driver images from one or more internal cameras, a group of lane images from one or more external cameras, and sensor signals from one or more sensors; and a hardware processor configured to:

determine a closed eyes statistic using a first classifier based on a driver image of the set of driver images;

determine a lane departure statistic using a second classifier based at least in part on the group of lane images;

determine a sensor statistic using a third classifier based at least in part on the sensor signals;

determine a current probability of a driver being drowsy based at least in part on the closed eyes statistic, the lane departure statistic, and the sensor statistic;

in response to the probability exceeding a first drowsiness threshold, provide a drowsy indication, wherein the drowsy indication causes a warning to the driver using an audio alert and/or a visual alert;

in response to the probability not exceeding the first drowsiness threshold and exceeding a second drowsiness threshold, adjust a storage threshold for storing events on the vehicle event recorder to an adjusted storage threshold, wherein the storage threshold comprises at least one of a distance to vehicle ahead, a speed change, and a duration blinkers are kept on; and store the events on the vehicle event recorder based at least in part on the adjusted storage threshold.

2. A system of claim 1, wherein the set of driver images and/or the group of lane images is/are collected over the time period.

3. A system of claim 1, wherein the set of driver images and/or the group of lane images is/are collected over a time interval different from the time period.

4. A system of claim 1, wherein the time period and the time interval are: overlapping, concurrent, have a same duration, have a different duration, or occur within a time window.

5. A system of claim 1, wherein the set of driver images over the time period comprises driver images over 30 seconds and/or images at 1 frame per second.

6. A system of claim 1, wherein the drowsy indication is further based at least in part on a trip duration.

7. A system of claim 1, wherein the drowsy indication is further based at least in part on a time of day.

8. A system of claim 1, wherein the lane departure statistic comprises percentage time in a lane over a second period of time.

9. A system of claim 1, wherein the drowsy indication is further based at least in part on sensor signatures associated with stopping events.

10. A system of claim 1, wherein the drowsy indication is further based at least in part on a yawning indication.

11. A system of claim 1, wherein the drowsy indication is further based at least in part on a curved road lane keeping indication.

12. A system of claim 1, wherein the drowsy indication is further based at least in part on a lane change profile.

13. A system of claim 1, wherein the drowsy indication is further based at least in part on a monotonous driving indication.

14. A system of claim 1, wherein the drowsy indication is further based at least in part on a reaction time to car in front braking.

15. A system of claim 1, wherein the drowsy indication is further based at least in part on a driver behavior.

16. A system of claim 1, wherein the drowsy indication is further based at least in part on a driver route familiarity indication.

17. A system of claim 1, wherein the hardware processor is further configured to store the drowsy indication and/or statistics for the drowsy indication.

18. A method, comprising:

receiving over a time period, by one or more interfaces of a vehicle event recorder mounted to a vehicle, a set of images from one or more internal cameras, a group of lane images from one or more external cameras, and sensor signals from one or more sensors;

determining, using a hardware processor of the vehicle event recorder, a closed eyes statistic using a first classifier based on a driver image of the set of driver images;

determining a lane departure statistic using a second classifier based at least in part on the group of lane images;

determining a sensor statistic using a third classifier based at least in part on the sensor signals;

determining a current probability of a driver being drowsy based at least in part on the closed eyes statistic, the lane departure statistic, and the sensor statistic;

in response to the probability exceeding a first drowsiness threshold, providing a drowsy indication, wherein the drowsy indication causes a warning to the driver using an audio alert and/or a visual alert;

in response to the probability not exceeding the first drowsiness threshold and exceeding a second drowsiness threshold, adjusting a storage threshold for storing events on the vehicle event recorder to an adjusted storage threshold, wherein the storage threshold comprises at least one of a distance to vehicle ahead, a speed change, and a duration blinkers are kept on; and storing the events on the vehicle event recorder based at least in part on the adjusted storage threshold.

19. A computer program product embodied in a non-transitory computer readable medium and comprising computer instructions for:

receiving over a time period, by one or more interfaces of a vehicle event recorder mounted to a vehicle, a set of images from one or more internal cameras, a group of lane images from one or more external cameras, and sensor signals from one or more sensors;

determining, using a hardware processor of the vehicle event recorder, a closed eyes statistic using a first classifier based on a driver image of the set of driver images;

determining a lane departure statistic using a second classifier based at least in part on the group of lane images;

determining a sensor statistic using a third classifier based at least in part on the sensor signals;

determining a current probability of a driver being drowsy based at least in part on the closed eyes statistic, the lane departure statistic, and the sensor statistic;

in response to the probability exceeding a first drowsiness threshold, providing a drowsy indication, wherein the drowsy indication causes a warning to the driver using an audio alert and/or a visual alert;

in response to the probability not exceeding the first drowsiness threshold and exceeding a second drowsiness threshold, adjusting a storage threshold for storing events on the vehicle event recorder to an adjusted storage threshold, wherein the storage threshold comprises at least one of a distance to vehicle ahead, a speed change, and a duration blinkers are kept on; and storing the events on the vehicle event recorder based at least in part on the adjusted storage threshold.

20. A system of claim 1, wherein the warning comprises a collision warning, a headway warning, a lane departure warning, a fitness to lane warning, a rolling stop warning, a vehicle speed warning, a pedestrian warning, or a long blinkers warning.

* * * * *